US009693225B2

(12) United States Patent
Plestid et al.

(10) Patent No.: US 9,693,225 B2
(45) Date of Patent: Jun. 27, 2017

(54) METHOD AND APPARATUS FOR A DUAL RADIO USER EQUIPMENT

(71) Applicant: BlackBerry Limited, Waterloo (CA)

(72) Inventors: Trevor Plestid, Ottawa (CA); Sylvie Allard, Ottawa (CA); Joseph Tu Long Deu-Ngoc, Maryhill (CA); Keizo Marui, Waterloo (CA)

(73) Assignee: BlackBerry Limited, Waterloo (CA)

(*) Notice: Subject to any disclaimer, the term of this patent is extended or adjusted under 35 U.S.C. 154(b) by 244 days.

(21) Appl. No.: 14/250,937

(22) Filed: Apr. 11, 2014

(65) Prior Publication Data

US 2015/0296378 A1 Oct. 15, 2015

(51) Int. Cl.
| | |
|---|---|
| *H04M 1/00* | (2006.01) |
| *H04W 4/00* | (2009.01) |
| *H04W 12/06* | (2009.01) |
| *H04W 8/12* | (2009.01) |
| *H04L 29/06* | (2006.01) |
| *H04W 88/06* | (2009.01) |
| *H04W 8/20* | (2009.01) |

(52) U.S. Cl.
CPC ............ *H04W 12/06* (2013.01); *H04L 63/18* (2013.01); *H04W 8/12* (2013.01); *H04W 8/20* (2013.01); *H04W 88/06* (2013.01)

(58) Field of Classification Search
CPC .................................. H04W 12/06; H04W 4/00
USPC ........ 455/558, 432.1–432.3, 433, 435.1, 418
See application file for complete search history.

(56) References Cited

U.S. PATENT DOCUMENTS

| | | | |
|---|---|---|---|
| 8,606,232 B2 | 12/2013 | Siu et al. | |
| 8,639,245 B2 | 1/2014 | Shi et al. | |
| 2003/0157926 A1* | 8/2003 | Ala-Laurila | H04M 15/00 455/406 |

(Continued)

FOREIGN PATENT DOCUMENTS

| | | |
|---|---|---|
| EP | 2410777 A1 | 1/2012 |
| WO | 2011158207 A1 | 12/2011 |

(Continued)

OTHER PUBLICATIONS

European Patent Office, Partial European Search Report on Application No. 15162808.8, Issued on Sep. 11, 2015.

(Continued)

*Primary Examiner* — Dung Hong
(74) *Attorney, Agent, or Firm* — Moffat & Co.

(57) ABSTRACT

A method at a user equipment capable of supporting at least two radio connections, the method including requesting from a remote server, using a first radio connection, a subscriber identity; receiving, at the user equipment, the subscriber identity over the first radio connection; using the subscriber identity to establish a second radio connection; and forcing the first radio connection to remain on a same network as the second radio connection. Further, a method at a user equipment capable of supporting at least two radio connections, the method receiving a subscriber authentication challenge over the second network connection; using the first radio connection to connect to the remote server to obtain an authentication challenge response for the subscriber authentication challenge; and sending the authentication challenge response over the second network connection.

20 Claims, 8 Drawing Sheets

(56) References Cited

U.S. PATENT DOCUMENTS

| | | | |
|---|---|---|---|
| 2004/0162058 A1* | 8/2004 | Mottes | H04M 3/4228 455/411 |
| 2006/0205434 A1* | 9/2006 | Tom | H04W 8/26 455/558 |
| 2006/0288407 A1* | 12/2006 | Naslund | H04L 9/0844 726/9 |
| 2008/0020755 A1 | 1/2008 | Liu et al. | |
| 2011/0294472 A1 | 12/2011 | Bramwell et al. | |
| 2013/0095797 A1* | 4/2013 | Paz | H04L 29/12905 455/411 |
| 2013/0183932 A1 | 7/2013 | Lemilainen et al. | |
| 2013/0310035 A1 | 11/2013 | Gouriou et al. | |
| 2015/0156817 A1* | 6/2015 | Paz | H04W 8/22 455/558 |
| 2015/0163731 A1* | 6/2015 | Kotecha | H04W 12/08 455/432.1 |

FOREIGN PATENT DOCUMENTS

| | | |
|---|---|---|
| WO | 2011159549 A9 | 12/2011 |
| WO | 2012173539 A1 | 12/2012 |
| WO | 2013040250 A1 | 3/2013 |
| WO | 2013097177 A1 | 7/2013 |
| WO | 2013171648 A1 | 11/2013 |
| WO | 2014122588 A1 | 8/2014 |

OTHER PUBLICATIONS

MV-370/MV-372 VoIP GSM Gateway User Manual, PORTech Communications Inc., accessed Feb. 10, 2014.

Product Information: SMB32, GSM SIM BANK, http://www.linksz.net/SMB32.htm, accessed Feb. 10, 2014.

Product Information: SBK-128, Remote SIM BANK, http://www.portech.com.tw/p3-product1_1.asp?Pid=65, accessed Feb. 10, 2014.

Setup MV-370 GSM Gateway with Asterisk, http://www.voip-info.org/wiki/view/Setup+MV-370+GSM+Gateway+with+Asterisk, accessed Feb. 10, 2014.

Product Information: SIM Server, www.pulsewan.com, accessed Feb. 10, 2014.

FAQs page, AT&T Cell Phones: What Does Remote SIM Mode Do on My SGH-A827 (Access)?, http://originus.samsung.com/us/support/faq/FAQ00022661/22829/SG, accessed Feb. 10, 2014.

European Patent Office, Extended European Search Report on Application No. 15162808.8 , Issued on Jan. 20, 2016.

European Patent Office, Extended European Search Report for Application No. 16201875.8, issued on Feb. 20, 2017.

* cited by examiner

METHOD AND APPARATUS FOR A DUAL RADIO USER EQUIPMENT

FIELD OF THE DISCLOSURE

The present disclosure relates to a method and apparatus for dual radio user equipment and in particular relates to roaming on a user equipment (UE) having a dual radio connection.

BACKGROUND

The use of user equipment, including smartphones, cellular phones, laptops, digital pagers, mobile devices, among others, is becoming more prevalent. Many of these mobile devices have at least one cellular connection which may be used for both circuit switched and packet switched calls. Such cellular connection is usually based on a subscription or prepaid plan with a cellular provider.

In order to access the cellular provider's network, a smart card, such as a universal integrated circuit card (UICC), is typically found on such devices, where the UICC has one or more applications used for subscriber identity verification. Such applications may, for example, include a subscriber identity module (SIM) application or a universal subscriber identity module (USIM) application for the global system for mobile communications (GSM) networks, for a universal mobile telecommunications system (UMTS system) or long term evolution (LTE) system, a code division multiple access (CDMA) subscriber identity module application (CSIM application) for a CDMA 2000 network, a remote-user identity module (RUIM) for a CDMA network, International Mobile Services (IMS) subscriber identity module (ISIM) for IMS services, among others. Once authenticated to the network, the user equipment may then exchange voice or data, depending on the subscription with the cellular network.

Outside of the subscriber's home cellular network, the UE roams on to a visitor network. Authentication still occurs with the home network and agreements between the visitor network and the home network allow for the billing of the customer. This authentication computation occurs physically on the UICC, where the network and the UICC each maintain a shared secret for this computation. Typically such billing is relatively expensive compared to the services acquired from the home cellular network.

BRIEF DESCRIPTION OF THE DRAWINGS

The present disclosure will be better understood with reference to the drawings, in which.

DETAILED DESCRIPTION OF THE DRAWINGS

The present disclosure provides a method at a user equipment capable of supporting at least two radio connections, the method comprising: requesting from a remote server, using a first radio connection, a subscriber identity; receiving, at the user equipment, the subscriber identity over the first radio connection; using the subscriber identity to establish a second radio connection; and forcing the first radio connection to remain on a same network as the second radio connection.

The present disclosure further provides a user equipment capable of supporting at least two radio connections, the user equipment comprising a processor and communications subsystem, wherein the user equipment is configured to: request from a remote server, using a first radio connection, a subscriber identity; receive the subscriber identity over the first radio connection; use the subscriber identity to establish a second radio connection; and force the first radio connection to remain on a same network as the second radio connection.

A roaming UE still needs to be authenticated to function on a visitor network. Such authentication will depend on the type of network, but typically a roaming UE authenticates to an authentication entity such as the user's home subscriber server (HSS) on the user's home cellular network. An HSS generally includes the home location registry (HLR) and the authentication center (AuC). A typical process for authentication in a Third Generation network is provided with regard to FIG. 1.

Figure 1:
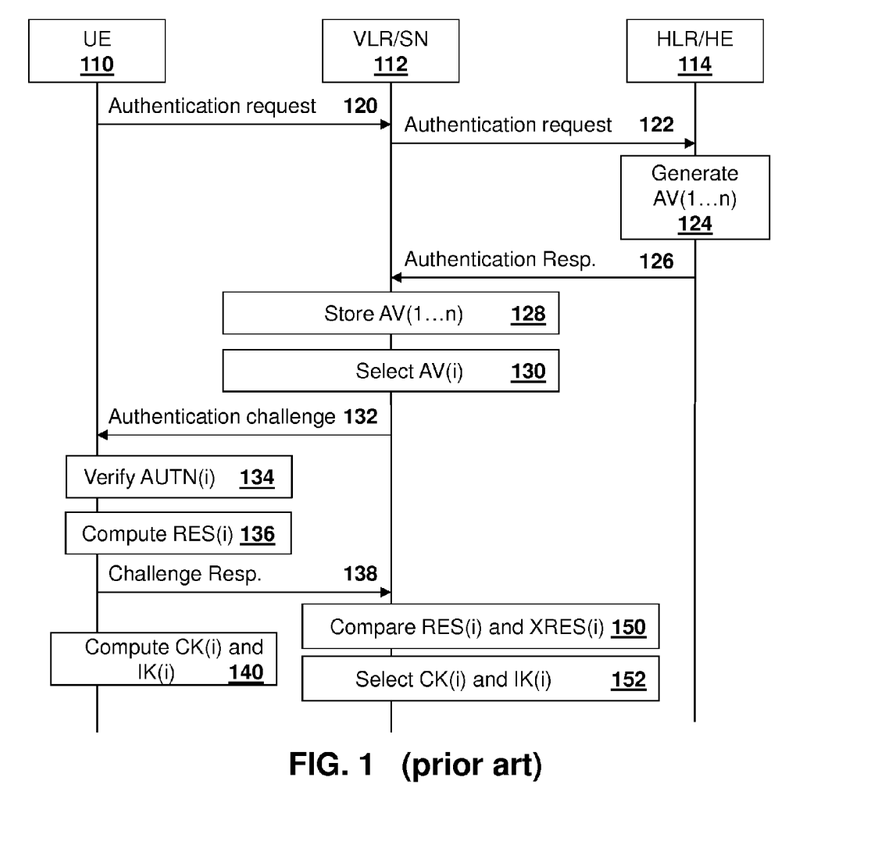
FIG. 1 is a dataflow diagram showing a typical authentication procedure in a third generation network.

Reference is now made to FIG. 1, which shows a user equipment 110 communicating with a Visitor Location Registry (VLR) or Serving Network (SN) 112. VLR/SN 112 further communicates with the Home Location Registry (HLR) or Home Entity (HE) 114.

When user equipment 110 enters the serving node, the user equipment 110 needs to be authenticated. In this case, the user equipment may send an authentication request 120 to VLR/SN 112, which may include an identifier such as the international mobile subscriber identity (IMSI) found in the identity module on the UE 110.

VLR/SN 112 receives the authentication request and forwards the authentication request, including the IMSI, to the HLR/HE 114, as shown by reference numeral 122.

The HLR/HE 114 receives the authentication request and, at block 124, generates a plurality of authentication vectors (AV), shown as AV(1 . . . n). An authentication vector includes a plurality of components. These include a random number (RAND), an expected response (XRES), a cipher key (CK), an integrity key (IK) and an authentication token (AUTN).

The authentication vectors are then sent back to the VLR/SN 112 in message 126.

At block 128, the VLR/SN 112 stores the authentication vectors.

Messages 120, 122, 126, along with blocks 124 and 128 provide for a first phase of the authentication protocol, namely the distribution of the authentication vectors from the home network to the VLR/SN 112.

A second phase of the authentication protocol is the authentication and key agreement procedures between the user equipment 110 and the VLR/SN 112. In particular, the VLR/SN 112 selects a random number and an authentication token from the authentication vectors, as shown by block 130. VLN/SN 112 and then provides a user authentication challenge 132 to user equipment 110.

The user equipment 110 receives the authentication challenge and, as shown by block 134, verifies the authentication token. Such authentication occurs in third generation networks. In second generation networks no such authentication token is provided.

The user equipment then computes a response based on the random number key provided, as shown at block 136. The response is provided back to the VLR/SN 112 in message 128.

The user equipment 110 further computes a cipher key and an integrity key, as shown by block 140.

VLR/SN 112, upon receiving the authentication response at message 138 compares the response with the expected response from the authentication vector, as shown by block 150. If the response and the expected response match then the VLR/SN 112 selects the cipher key and integrity key at block 152, where the selected cipher key and integrity key match with those computed at block 140 on the user equipment 110.

The above therefore shows the authentication of a third generation device such as a UMTS device that is roaming to a visiting service network as described in the third generation partnership project (3GPP) Technical Specification (TS) 33.102, "3*G Security; Security architecture*", v. 11.6.0, March 2014, the contents of which are incorporated herein by reference.

For second generation networks such as GSM, mutual authentication does not occur but similar procedures occur where the authentication request includes a number which is used at the UE 110 to compute a response which is then provided back to the VLR/SN 112 and compared with an expected response as described in 3GPP TS 43.020, *"Security related network functions"*, v. 12.0.0, March 2013, the contents of which are incorporated herein by reference.

The user equipment is then capable of operating on the visiting network. However, such operation may be prohibitively expensive. In particular, the roaming charges for voice and data services are particularly high when compared with the charges on the home network.

One option for users roaming into networks is the substitution of the smartcard, such a SIM card or USIM card, on the user equipment with a smartcard having an identity operable on a local network. However, such substitution has its disadvantages. In particular, the user must purchase a new smartcard and insert it into the user equipment. This may involve finding a provider for the local network, communicating with the provider, establishing terms of service and inserting the card into the user equipment. Such requirements may be cumbersome, especially when frequent travel or frequent roaming occurs.

Further, by removing the home smartcard the user equipment is then unreachable with the home telephone number as the use of the roaming smartcard establishes a new telephone number for the user equipment.

One way to remain in contact when roaming uses a user equipment having dual identity modules, where two radio connections may be established using the two identities. In such devices, both radio connections may be used simultaneously. Such devices are sometimes referred to as dual SIM dual active (DSDA) devices.

In a DSDA device, a first identity may be the user's home identity and the second identity may be an identity for roaming in the visitor network. In this case, the DSDA device would be reachable both on the home identity as well as on the roaming identity.

Figure 2:
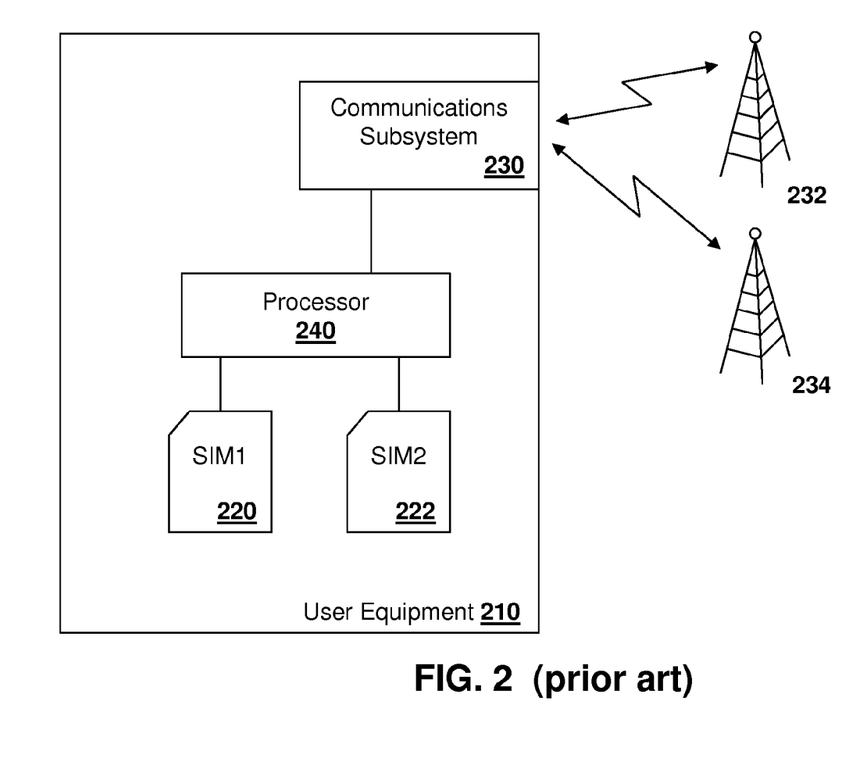
FIG. 2 is a block diagram of a simplified example dual SIM dual active device.

For example, reference is now made to FIG. 2, which shows a simplified device diagram in which a user equipment 210 includes a first identity module 220 and a second identity module 222. The user equipment 210 communicates through a communication subsystem 230 with one or more networks 232 or 234. In the embodiment of FIG. 2, user equipment 210 is capable of simultaneous communications with both identities using communications subsystem 230.

Processing functionality is on the device is performed by processor 240.

Communications to and from the UE 210 may be decoded in accordance with the correct cipher based on whether the communication was received for the identity stored in the first identity module 220 or the second identity module 222.

However, even with UE 210, a call directed to the home identity of the user equipment would be directed through a roaming connection to user equipment 210 and thereby incur roaming charges. Thus, while local calls could be made using the second identity and data exchange could also use the second identity, roaming charges are still possible.

A further issue with UE 210 is that the second identity module would still need to be obtained and installed in order to communicate without roaming charges in the visited network.

In order to overcome the above, and in accordance with one embodiment of the present disclosure, the second identity on a dual identity device could be obtained from a remote SIM bank. In other words, a first radio on the user equipment uses the home carrier identity. When the UE is roaming, the home SIM may establish a roaming data connection to the internet using that first radio connection. Such radio connection persists, unless a lower cost radio is found. A lower cost radio may be for example a Wi-Fi connection. As used herein, such first roaming connection is referred to as a bootstrapping data connection. This bootstrapping data connection is utilized solely for the purposes of authentication of SIMs in the remote SIM bank. The roaming data cost of the minimal data for authentication challenges and responses will be far offset by the use of the local market SIM for all other subscriber uses.

Further, as used herein, the remote SIM bank can include any type of physical universal integrated circuit card or smart card, housing applications for SIM, RUIM, USIM, ISIM, etc, or remote SIM bank may house virtual SIMs, and the present disclosure is not limited to any particular subscriber identity module within the SIM bank The roaming data connection can then be used to connect to a remote SIM bank, which will provide an identity to be used by the second radio of the DSDA device. The second identity may then allow for the device to act as if it was on a home network when in the remote location.

The first radio connection is however maintained and is used to forward network challenges from the second radio connection to the remote SIM bank, and to receive challenge responses back from the remote SIM bank. Thus only administrative SIM data is communicated over the first radio bearer once the second radio connection is established, and all other circuit switched and packet switched traffic uses the second radio connection.

Figure 3:
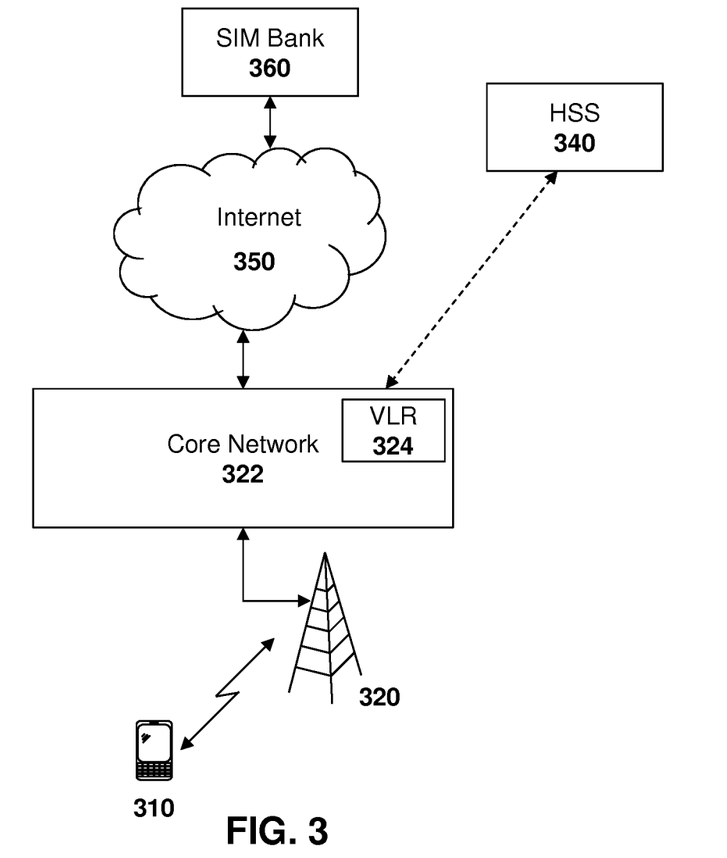
FIG. 3 is a simplified architectural diagram of one embodiment of the present disclosure.

Reference is now made to FIG. 3, which shows a simplified network diagram in accordance with the present disclosure. In FIG. 3, user equipment 310 is roaming and communicates with a visitor network, comprising, in the simplified embodiment of FIG. 3, radio access network 320

(including but not limited to a base station, node B or evolved Node B), and a core network 322, which includes the visitor location registry 324.

UE 310 attempts to connect and authenticate to the visitor network. This is done by sending an identity, such as the UE's home network IMSI, through the VLR 324, which then communicates with the HSS 340 over a network, such as for example a GLa interface and obtains the authentication vectors as described above with regard to FIG. 1. A challenge and response is then used to authenticate UE 310.

Once the UE 310 is authenticated, the first radio connection using the first identity may then be used as a bootstrapping connection to obtain a second identity. It should be noted that internet connection 350 can be used for this purpose (USB tethered to computer, wifi connection, among other options), in some cases. In particular, the user equipment 310 may then use the first connection to send a data request, which travels through Internet 350, to a remote SIM bank 360.

In one embodiment, the request may include a request for an identity on a particular network. In an alternative embodiment the user equipment may provide location information such as the mobile country code (MCC) of the first network connection to the remote SIM bank 360. The remote SIM bank 360 may utilize this information, along with knowledge of networks in that location, to determine a network operator to use to avoid roaming charges.

In other embodiments, user equipment 310 may provide information on networks that it can see when communicating with SIM bank 360, based on previous network scans in establishing the first roaming connection.

SIM Bank 360 provides an identity back to UE 310 over the first radio connection. The UE 310 may then attempt to connect to a network on a second radio connection using a second identity. The second network that the UE 310 tries to connect with may or may not be the same as the network used for the first radio connection.

In response to the connection attempt, the second network will provide a challenge which can then be conveyed, by the UE 310 to SIM bank 360 over the first radio connection. SIM bank 360 can be used to generate a response and forward the response through first connection back to UE 310. UE 310 can then convey the response to the second network using the second radio connection.

Figure 4:
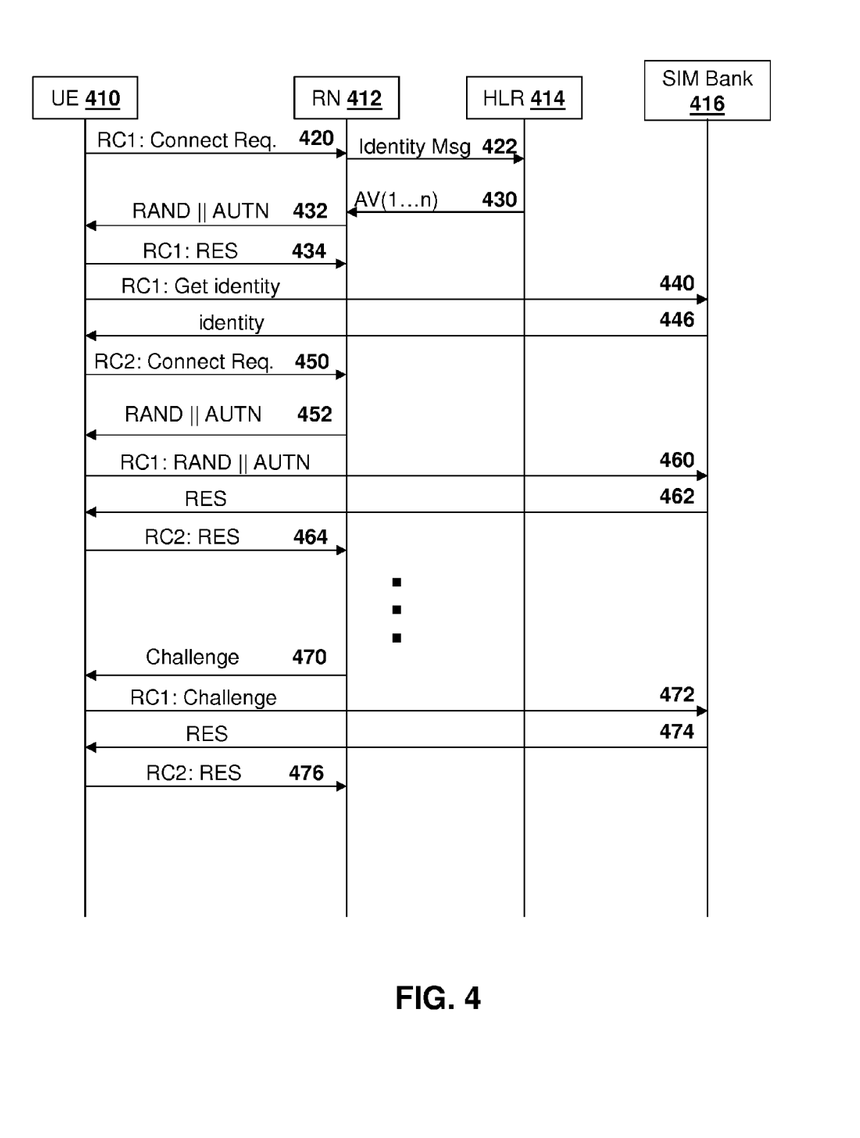
FIG. 4 is a dataflow diagram showing use of a SIM bank to obtain and authenticate an identity for a second radio connection.

In particular, an example dataflow sequence for a UE arriving in a remote (non-home) location is shown with regard to FIG. 4. In the example of FIG. 4, it is assumed that the radio network used for roaming is also be the radio network that is then connected to with the second communications identity. However, this is not limiting and in other cases the networks connected based on the first and second identities may be different.

In FIG. 4, UE 410 communicates with a local radio network (RN) 412. A home location registry 414 for UE 410 may be accessed through a connection such as the internet by the RN 412. Further, a SIM bank 416 may be accessed through the internet.

The process of FIG. 4 starts when UE 410 enters the network. For example, if the user equipment is activated upon landed at an airport in a foreign jurisdiction, the UE 410 may send, over a first radio connection, a connection request 420 to RN 412. Such request may include the identity of a first subscriber identity (i.e. a home identity) on UE 410.

The RN 412 receives connection request 420 and sees that the UE identity belongs to a remote network. The RN 412 therefore forwards the identity in message 422 to the home location registry 414 associated with the identity.

Based on the identity in message 422, HLR 414 sends authentication vectors back to radio network 412, as shown by message 430. As with Figure above, the radio network 412 chooses the random number and authentication token and forwards this as an authentication challenge 432 to UE 410.

UE 410 then uses the first smart card (SIM) to generate a response 434, which is then sent back from UE 410 to the radio network 412. Radio network 412 authenticates the response based on the expected response from the authentication vector and, in the example of FIG. 4, authenticates the first identity on UE 410. Thus messages 420 to 434 are the same as the messages identified above with regards to FIG. 1.

UE 410 may then use that first radio connection to obtain a second identity. In particular, UE 410 may use the first radio connection to send a request to SIM bank 416 to get an identity. Such request is shown by message 440, and proceeds through radio network 412 over the internet to the SIM bank 416.

SIM bank 416 then provides an identity back through radio network 412 to UE 410, as shown by message 446. The authentication algorithm remains within the physical SIM housed within the remote SIM Bank in one embodiment.

Once the identity is received, UE 410 may then try to authenticate a second radio connection. In the example of FIG. 4, the second radio connection is attempted with radio network 412. However in other cases the UE may attempt to authenticate to a different radio network than the first radio connection.

Thus, UE 410 sends, over a second radio connection, a connection request 450 to radio network 412. In this case, the request is a local request which is verified in the HLR of network 412.

Radio network 412 then sends a key back to UE 410 over the second radio connection. For example the key may be a random number and authentication token if a third generation authentication is occurring. The key may also be just a random number if a second generation authentication is occurring. Other examples are possible. The sending of the key as part of the authentication challenge is shown by message 452 in the embodiment of FIG. 4.

UE 410 receives the challenge and, using the first radio connection, forwards the challenge to SIM bank 416, as shown by message 460. SIM bank 416 may then utilize the SIM for the radio network 412 to process the challenge and provide a response, which is forwarded back to UE 410 in message 462. Message 462 is received by UE 410 over the first radio connection.

UE 410 may then use the second radio connection to send a response back to radio network 412. Once radio network 412 receives the response it can then authenticate the response with the expected response and, in the embodiment of FIG. 4, the second radio connection is authenticated.

The second radio connection in the embodiment of FIG. 4 may then be used for data exchange or for voice or circuit switched calls pursuant to the terms of service associated with the second identity.

Occasionally, for example if the UE 410 causes enough location area updates (LAU), re-authentication may be required for the second radio connection at UE 410. In this case, radio network 412 sends an authentication challenge to UE 410, over the second radio connection, as shown by message 470 in FIG. 4. UE 410 can then forward the challenge to SIM bank 416, as shown by message 472. The smart card or identity module at SIM bank 416 then performs the authentication and SIM bank 416 provides a response 474 over the first radio connection to UE 410. The UE 410 then uses the second radio connection to send the challenge response 476 back to radio network 412.

The use of SIM bank 416 allows for the dynamic selection of an identity for the area in which the user equipment is located, allowing a local connection without having to insert a new identity module or negotiate with local service providers.

Further, in one embodiment, SIM bank 416 reuses identities. In particular, once UE 410 leaves the roaming area then the identity module may be reused for the next UE that roams into that area. This permits the sharing of the SIM among multiple users and lowers operator costs for such a service.

In one embodiment, SIM bank 416 may be associated with the network operator of the home network of user equipment 410. In this case, the obtaining of the local identity may be done automatically or based on user section on the UE once the UE receives a network identifier indicating that the UE is roaming. In other embodiments, no such association may exist. For example, the SIM bank may be run by a third party and the initiation of the obtaining of the identity as shown at message 440 may be done based on the selection by a user of UE 410 through an application on UE 410.

SIM bank 416 may house physical smart (SIM) cards. In this case, the physical SIM cards or UICCs are located at the remote location and the authentication occurs by providing the challenge directly to those smart cards. For example, each network operator may have its own authentication algorithms for the challenge response mechanism. By using physical smart cards, such network operators do not need to disclose the authentication methods to a third party such as one operating a SIM bank 416.

In other embodiments, SIM bank 416 may utilize virtual SIM cards. In this case, a computer may run the algorithms that would normally be run directly on the physical SIM and provide the response. This may occur, for example, if the SIM bank has agreements with the network operator, or if the SIM bank runs as mobile network virtual operator, as described below. One key advantage to this, where the SIM bank and MVNO are run together, is that the timing of the authentication challenges may be tuned for the methods above. For example, a short authentication timeout when an authentication challenge is conducted over the first radio connection may expire, whereas adjusting the timing of the authentication timeout will ensure no such timeout occurs based on the extra time used for authentication. Further, a dynamic timeout could be used by the MVNO, where such timeout adapts to delays in authentication challenges. For example, if responses to authentication challenges are received after a timeout, the MVNO could adjust the timers to increase the timer length. Conversely, if responses are typically received well before a timer expires, the length of the timer could be reduced.

Other options are possible.

In one embodiment, while a first radio connection may be maintained to ensure that authentication may happen regardless of where the mobile device is, if the user equipment has an alternative connection that may be a lower cost connection than the roaming radio connection, the user equipment 410 may opportunistically use such second alternative connection.

Specifically, if the UE is connected through Wi-Fi to the Internet then the UE may, instead of using the first radio connection to obtain the SIM identity use the Wi-Fi connection. In this way, roaming charges on the first radio connection may be reduced further by advantageously using such lower cost radio connection. Other connections, both wired and wireless, including Bluetooth™, universal serial bus (USB), near field communications (NFC), among others could equally be used.

Figure 5:
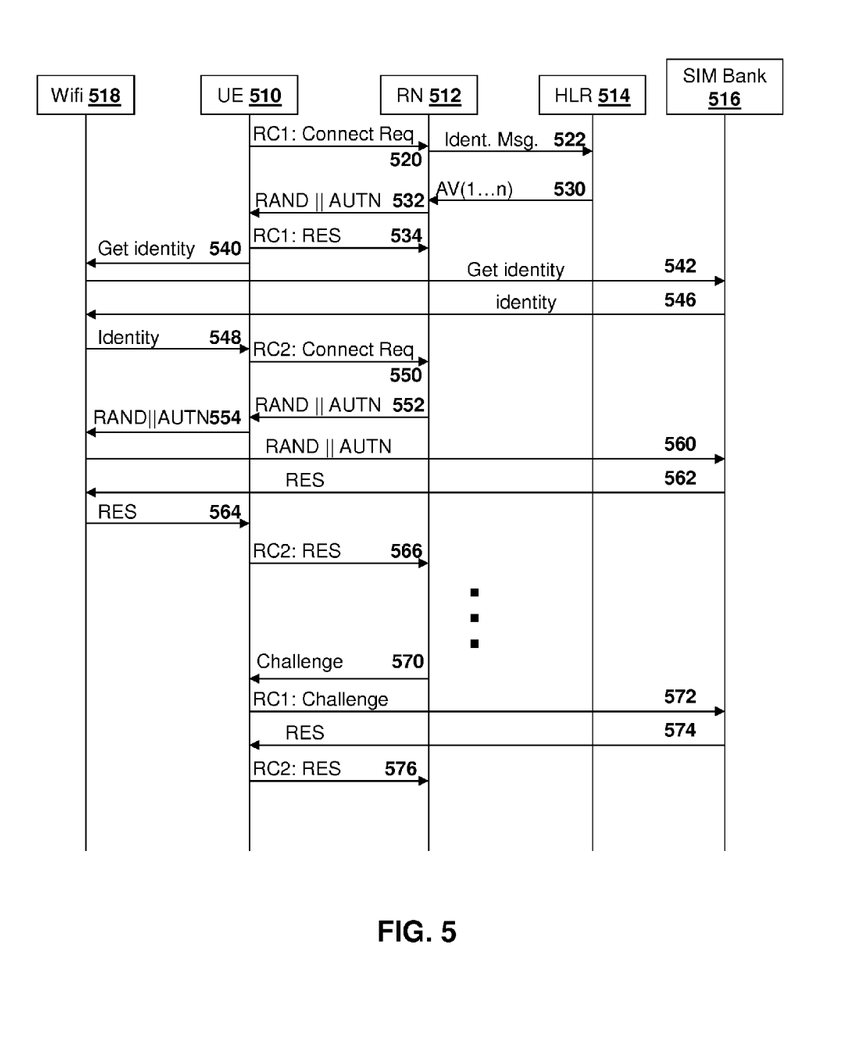
FIG. 5 is a dataflow diagram in which an alternative network connection is used to obtain and authenticate an identity for a second radio connection from a SIM bank.

Reference is now made to FIG. 5. As seen in FIG. 5, UE 510 communicates with a radio network 512, which may then communicate with a home location registry 514 and a SIM bank 516. Further, UE 510 also communicates through an access node 518 in the embodiment of FIG. 5, which may be used to connect to the Internet and therefore to SIM bank 516.

When a UE first moves into the area of the radio network 512, the same connection procedures as discussed above with regard to FIG. 4 occurs. Specifically, a connection request 520 is sent to the radio network which is then forwarded to the home location registry 514 through a message 522.

The HLR 514 sends the authentication vector in message 530 and the radio network 512 then provides a random key and authentication if using third generation authentication in challenge message 532.

The UE 510 may then use the first smart (SIM) card to generate and provide a response 534 to be authenticated by radio network 512.

In the embodiment of FIG. 5, even though a first radio connection exists, a WiFi connection also exists, and the UE therefore opportunistically takes advantage of the lower cost data connection and sends a request 540 to get an identity through access node 518. Request 540 is forwarded by the access node 518 to the SIM bank 516, as shown by message 542.

The identity is then returned through the access node 518 as shown by messages 546 and 548.

Next, the UE may then connect to the radio network 512 using a second radio connection and received identity, as shown by message 550. A challenge is received at message 552.

UE 510 may then utilize the access node 518 to send the challenge to SIM bank 516, as shown with messages 554 and 560, and receive a response, as shown by messages 562 and 564.

UE 510 then sends the response 566 using the second radio connection to the radio network 512.

In the embodiment of FIG. 5, a challenge 570 for the second radio connection is subsequently received after the UE 510 has moved out of WiFi coverage. In this case, UE 510 uses the first radio connection to communicate with SIM bank 516 to forward the challenge in message 572 and receive a response 574. The UE 510 can then forward the received response on the second radio connection to RN 512, as shown by message 576.

The use of the alternative connection in the embodiment of FIG. 5 allows for the savings of roaming costs even for the obtaining of the second SIM identity. However, even with an alternative connection, in one embodiment the first radio connection is maintained. This is done to ensure that if a challenge is received subsequently, if the mobile device has moved out of coverage of the access node 518 there is still a way to provide for the authentication and provide a response to radio network 512.

Further, in one embodiment, the UE may wish to force the first radio connection to track onto the network of the second radio connection. This ensures that the first radio connection is always available for authentication of the second radio connection. In particular, if the first radio connection and the second radio connection are for different networks, as the mobile device or UE is moving then the connection to the first radio connection may be lost. If an authentication request is received while out of coverage of the first connection, the authentication will necessarily time out and fail. One embodiment of the present disclosure therefore ensures that both the first and second radio connections are for the same network to ensure the availability of an authentication link.

Figure 6:
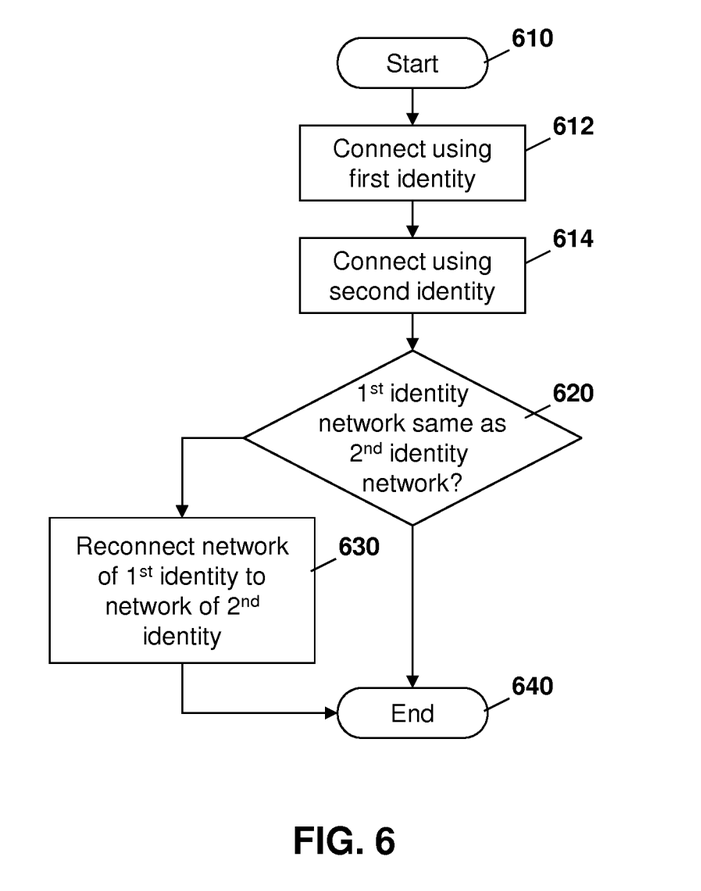
FIG. 6 is a flow diagram showing a process for ensuring a first and second radio connection are connected to the same network.

Reference is now made to FIG. 6, which shows a flow diagram of a process at a UE for ensuring the two connections share the same network. In particular, the process starts at block 610 and proceeds to block 612. At block 612, the UE connects using the first device identity. As described above with regard to FIGS. 4 and 5, this first identity is the home identity of the user equipment.

The process then proceeds to block 614 in which the UE connects using the second identity. As described above with regard to FIGS. 4 and 5, the second identity is the identity obtained from the SIM bank.

The process then proceeds to block 620 in which a check is made to determine whether the network that the first identity is used to connect to is the same as the network the second identity is used to connect to. If no, the two connections are on different networks and the potential problem exists if the first network connection is lost then the second connection may not be capable of being authenticated. In this case, the process proceeds to block 630 in which the first network identity is used to reconnect to the network of the second identity.

In some circumstances, connection by the first radio and the second radio to the same network may not be possible. For example, if the home network of a user has a roaming agreement with a competitor of the network used by the SIM bank then the two identities may not be usable on a single network. In this case, various options are possible. A first option would be to provide a new network identity to the SIM bank mapping to the network supporting the first radio connection to ensure that the SIM bank chooses a compatible identity for the first network connection. Alternatively the user equipment could detect the inability to connect the first and second connections to the same network and could report this to the SIM bank to request a new identity.

In a further alternative embodiment, the two identifies on incompatible networks could be allowed if no compatible identifiers are available for that location. In this case, authentication may not be possible if the first network is out of coverage.

From block 620 if the two identities are used to connect to the same network, or from block 630, the process proceeds to block 640 and ends.

In addition to using the first radio connection to obtain an identity and for providing a challenge and receiving a response, error codes may also be conveyed using the first radio connection. Specifically, if authentication fails then the network will convey a standardized "cause code" to the UE. The UE could then convey the cause code over the first radio connection to the SIM bank to resolve the issue.

For example, if a SIM identity has expired, a cause code of 23 in a GSM network, indicating GSM authentication unacceptable, can be sent over the first radio connection to the SIM bank, which may respond by providing a new, non-expired identity.

Other options for signaling over the first radio connection are possible.

In one embodiment, some networks may have an insufficient timeout value for authentication to realize a SIM bank. Specifically, if the system of FIG. 4 is used, the duration between the receipt of challenge message 452 and the receipt by the network of challenge response 464 must occur prior to an authentication timeout. If the network timer for the authentication duration is too short then authentication using the second radio connection may never occur.

In accordance with one embodiment of the present disclosure, a SIM bank operator may further become a mobile virtual network operator (MVNO) in one or more jurisdictions. An MVNO is a company that does not own license spectrum or its own network infrastructure typically. Instead, MVNOs purchase bulk spectrum from mobile network operators (MNOs) and resell such spectrum to customers.

In some cases, MVNOs may provide their own authentication, including identities, challenges and expected responses. The MVNO may further establish timers for authentication duration.

Therefore, in accordance with one embodiment of the present disclosure, if the SIM bank operator was further an MVNO or associated with an MVNO, then authentication timers could be extended to ensure sufficient time for the sending of the authentication challenge and receiving the authentication response from the SIM bank.

Also, the MVNO could dynamically assign a roaming number (mobile subscriber integrated services digital network number (msisdn)) to any identity in the SIM bank. For example, the identity might be the ISIM identity. In this case, the user may always have the same roaming number throughout the region that the subscriber identity is used, and further the same roaming number could be used by the same user on subsequent trips.

Further, any computer readable medium may be used to store data and executable program code associated with the above methods. Such data may for example include the subscriber identities from above, and the executable program code may include the functionality for the UE to obtain and use an identity from a remote SIM bank as described with regards to FIGS. 3 to 6. Further, in other embodiments, the data and program code may be distributed among various computer readable media, such as, for example, a memory on a UICC within a SIM bank, memory on a server hosting the SIM bank and a memory on an ME, and may be used for the embodiments of FIGS. 3 to 6 above. In one embodiment, such computer readable medium/media may be tangible and non-transitory. Examples of such computer readable media include flash memory 724 on UE 700 from FIG. 7, or memory 840 on network element 810 from FIG. 8, among others.

Any user equipment could be used to implement the above. One example user equipment is shown below with regards to FIG. 7.

Figure 7:
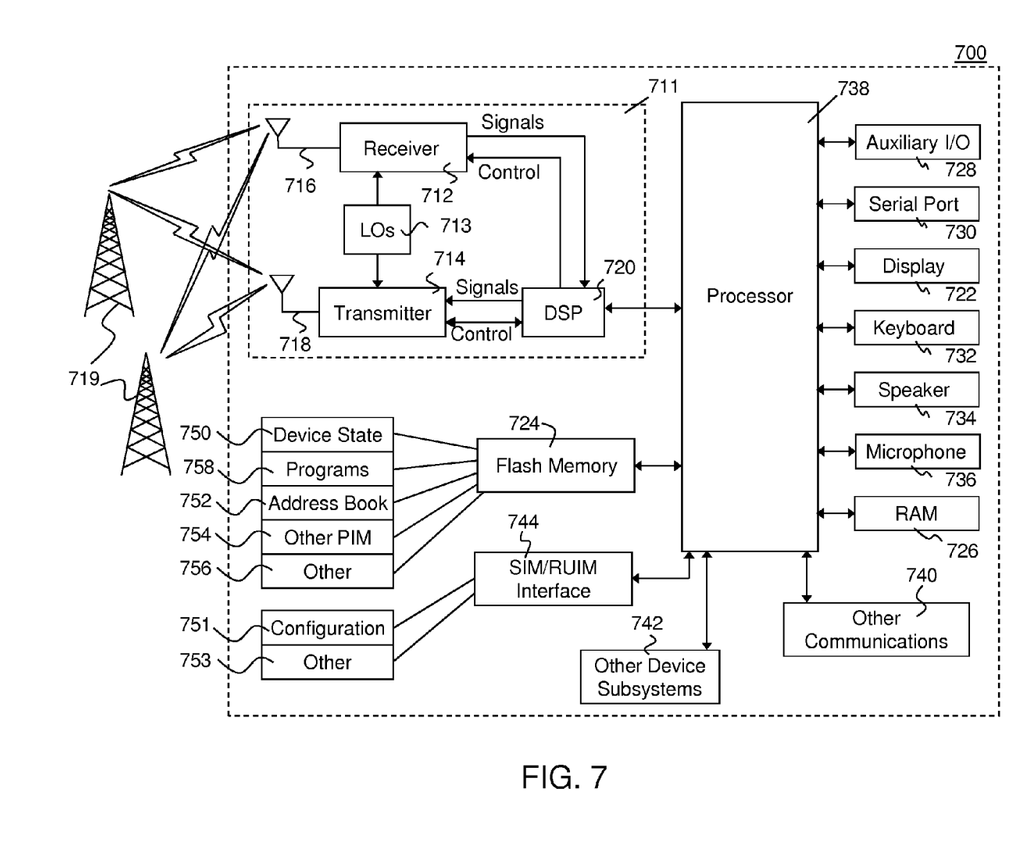
FIG. 7 is a block diagram of a mobile device capable of being used with the embodiments of the present disclosure.

UE 700 may be a two-way wireless communication device having voice and data communication capabilities. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 700 is enabled for two-way communication, it may incorporate a communication subsystem 711, including both a receiver 712 and a transmitter 714, as well as associated components such as one or more antenna elements 716 and 718, local oscillators (LOs) 713, and a processing module such as a digital signal processor (DSP) 720. Although not shown, communication subsystem 711 may include additional components. For example, UE 700 may comprise multiple receivers 712 and/or transmitters 714 to allow for simultaneous radio activity. In addition, as will be apparent to those skilled in the field of communications, the particular design of the communication subsystem 711 will be dependent upon the communication network in which the device is intended to operate.

Network access requirements will also vary depending upon the type of network 719. In some networks network access is associated with a subscriber or user of UE 700. A UE may require one or more smart cards which can contain different applications such as a USIM, RUIM or a SIM application in order to operate on a network. The smart card interface 1044 is normally similar to a card-slot into which a smart card can be inserted and ejected. The smart card can have memory and hold many key configurations 751, and other information 753 such as identification, and subscriber related information.

When required network registration or activation procedures have been completed, UE 700 may send and receive communication signals over the network 719. As illustrated in FIG. 7, network 719 can consist of multiple base stations communicating with the UE.

Signals received by antenna 716 through communication network 719 are input to receiver 712, which may perform such common receiver functions as signal amplification, frequency down conversion, filtering, channel selection and the like. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

UE 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the UE. A predetermined set of applications that control basic operations, including at least data and voice communication applications for example, will normally be installed on UE 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 719. Further applications may also be loaded onto the UE 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the UE 700.

In a data communication mode, a received signal such as a text message or web page download will be processed by the communication subsystem 711 and input to the processor 738, which may further process the received signal for output to the display 722, or alternatively to an auxiliary I/O device 728.

A user of UE 700 may also compose data items such as email messages for example, using the keyboard 732, which may be a complete alphanumeric keyboard or telephone-type keypad, among others, in conjunction with the display 722 and possibly an auxiliary I/O device 728. Such composed items may then be transmitted over a communication network through the communication subsystem 711.

For voice communications, overall operation of UE 700 is similar, except that received signals would typically be output to a speaker 734 and signals for transmission would be generated by a microphone 736. Alternative voice or audio I/O subsystems, such as a voice message recording subsystem, may also be implemented on UE 700. Although voice or audio signal output is generally accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type UE for which synchronization with a user's desktop computer (not shown) may be desirable, but is an optional device component. Such a port 730 would enable a user to set preferences through an external device or software application and would extend the capabilities of UE 700 by providing for information or software downloads to UE 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the UE to a computer to act as a modem.

Other communications subsystems 740, such as a short-range communications subsystem, is a further optional component which may provide for communication between UE 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may further include non-cellular communications such as WiFi or WiMAX.

In addition, the above may be implemented by any network elements.

Figure 8:
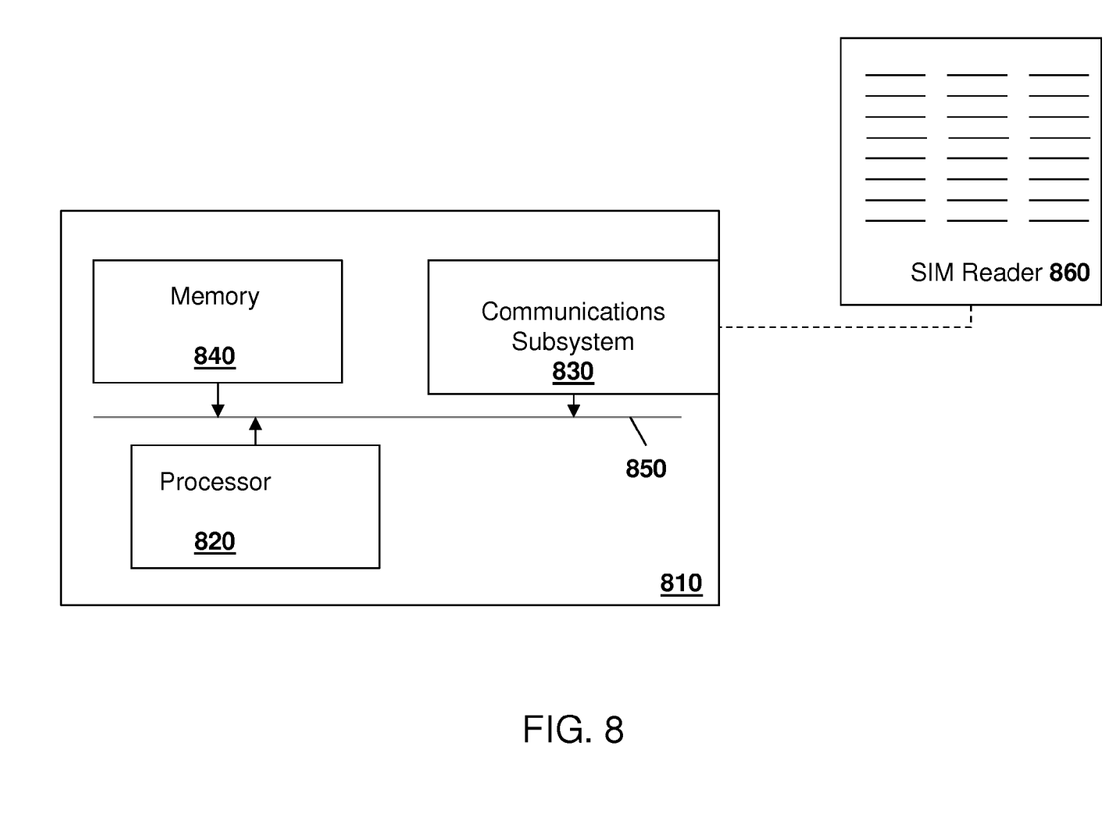
FIG. 8 is a block diagram of a simplified SIM bank.

In particular, the eNBs, VLRs, HLRs and network elements referred to and shown herein may be any network element, or part of any network element, including various network servers. Also, the SIM bank may be considered a network element. Reference is now made to FIG. 8, which shows a generalized example network element.

In FIG. 8, network element 810 includes a processor 820 and a communications subsystem 830, where the processor 820 and communications subsystem 830 cooperate to perform the methods of the embodiments described above.

Processor 820 is configured to execute programmable logic, which may be stored, along with data, on network element 810, and shown in the example of FIG. 8 as memory 840. Memory 840 can be any tangible storage medium.

Alternatively, or in addition to memory 840, network element 810 may access data or programmable logic from an external storage medium, for example through communications subsystem 830.

Communications subsystem 830 allows network element 810 to communicate with other network elements.

Communications between the various elements of network element 810 may be through an internal bus 850 in one embodiment. However, other forms of communication are possible.

Further, if the network element 810 is a SIM bank (virtual or real) communications subsystem 830 may be used to connect to an external board or reader 860 to allow physical smart cards to be inserted and interacted with. Such reader may support a plurality of smart cards, and the interaction may be addressable to a particular smart card for authentication purposes and to obtain identities.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

For example, in one embodiment, the present disclosure provides for various clauses:

AA. A method at a user equipment capable of supporting at least two radio connections, a first radio connection being on a same network as the second radio connection, the method comprising: receiving a subscriber authentication challenge over the second network connection; using the first radio connection to connect to a remote server to obtain an authentication challenge response for the subscriber authentication challenge; and sending the authentication challenge response over the second network connection.

BB. The method of clause AA, further comprising: requesting from a remote server, using the first radio connection, a subscriber identity; receiving, at the user equipment, the subscriber identity over the first radio connection; using the subscriber identity to establish the second radio connection; and forcing the first radio connection to remain on a same network as the second radio connection.

CC. The method of clause BB, wherein the received subscriber identity is for a network in a jurisdiction in which the user equipment is physically present.

DD. The method of claim clause AA, wherein an operator of a network is a mobile virtual network operator (MVNO).

FF. The method of clause DD, wherein the sending the authentication challenge response is performed within a time value set by the MVNO.

GG. The method of clause FF, wherein the MVNO operates the remote server.

HH. The method of clause DD, wherein a roaming number is dynamically assigned to any identity within the remote server.

II. The method of clause BB, wherein a first radio subscriber identity is a home carrier subscriber identity.

JJ. The method of clause AA, wherein the remote server is a subscriber identity module bank.

KK. The method of clause JJ, wherein the subscriber identity is returned by the user equipment for reuse by the subscriber identity module bank.

Other clauses are possible.

The invention claimed is:

1. A method at a user equipment capable of supporting at least two radio connections, the method comprising:
  requesting from a remote server, using a first radio connection for a first subscriber identity, a second subscriber identity;
  receiving, at the user equipment, the second subscriber identity over the first radio connection;
  using the second subscriber identity to establish a second radio connection; and maintaining the first and second radio connections, and forcing the first radio connection to remain on a same network as the second radio connection, comprising:
determining whether the first radio connection is on the same network as the second radio connection; and
if the first radio connection is not on the same network as the second radio connection, re-establish the first radio connection on the same network as the second radio connection using the first subscriber identity.

2. The method of claim 1, further comprising:
receiving a subscriber challenge over the second network connection;
using the first radio connection to connect to the remote server to obtain a challenge response for the subscriber challenge; and
sending the challenge response over the second network connection.

3. The method of claim 2, wherein the received second subscriber identity is for a network in a jurisdiction in which the user equipment is physically present.

4. The method of claim 3, wherein an operator of a network is a mobile virtual network operator (MVNO).

5. The method of claim 4, wherein the sending the challenge response is performed within a time value set by the MVNO.

6. The method of claim 5, wherein the MVNO operates the remote server.

7. The method of claim 4, wherein a roaming number is dynamically assigned to any identity within the remote server.

8. The method of claim 1, wherein the first subscriber identity is a home carrier subscriber identity.

9. The method of claim 1, wherein the remote server is a subscriber identity module bank.

10. The method of claim 9, wherein the second subscriber identity is returned by the user equipment for reuse by the subscriber identity module bank.

11. A user equipment capable of supporting at least two radio connections, the user equipment comprising a processor and communications subsystem, wherein the user equipment is configured to:
request from a remote server, using a first radio connection for a first subscriber identity, a second subscriber identity;
receive the second subscriber identity over the first radio connection;
use the second subscriber identity to establish a second radio connection; and
maintain the first and second radio connections, and force the first radio connection to remain on a same network as the second radio connection, comprising:
determining whether the first radio connection is on the same network as the second radio connection; and
if the first radio connection is not on the same network as the second radio connection, re-establish the first radio connection on the same network as the second radio connection using the first subscriber identity.

12. The user equipment of claim 11, wherein the user equipment is further configured to:
receive a subscriber challenge over the second network connection;
use the first radio connection to connect to the remote server to obtain a challenge response for the subscriber challenge; and
send the challenge response over the second network connection.

13. The user equipment of claim 12, wherein the received second subscriber identity is for a network in a jurisdiction in which the user equipment is physically present.

14. The user equipment of claim 13, wherein an operator of a network is a mobile virtual network operator (MVNO).

15. The user equipment of claim 14, wherein the user equipment is configured to send the challenge response within a time value set by the MVNO.

16. The user equipment of claim 15, wherein the MVNO operates the remote server.

17. The user equipment of claim 11, wherein a first subscriber identity is a home carrier subscriber identity.

18. The user equipment of claim 11, wherein the remote server is a subscriber identity module bank.

19. The user equipment of claim 18, wherein the second subscriber identity is returned by the user equipment for reuse by the subscriber identity module bank.

20. A method at a user equipment capable of supporting at first and second radio connections, the first radio connection being for a first subscriber identity, the method comprising:
after establishing the second radio connection using a second subscriber identity and while maintaining the first radio connection:
forcing the first radio connection to remain on a same network as the second radio connection, comprising:
determining whether the first radio connection is on the same network as the second radio connection, and if the first radio connection is not on the same network as the second radio connection, re-establish the first radio connection on the same network as the second radio connection using the first subscriber identity;
receiving a subscriber authentication challenge over the second network connection;
using the first radio connection to connect to a remote server to obtain an authentication challenge response for the subscriber authentication challenge; and
sending the authentication challenge response over the second network connection.

* * * * *